United States Patent Office 3,269,497
Patented August 30, 1966

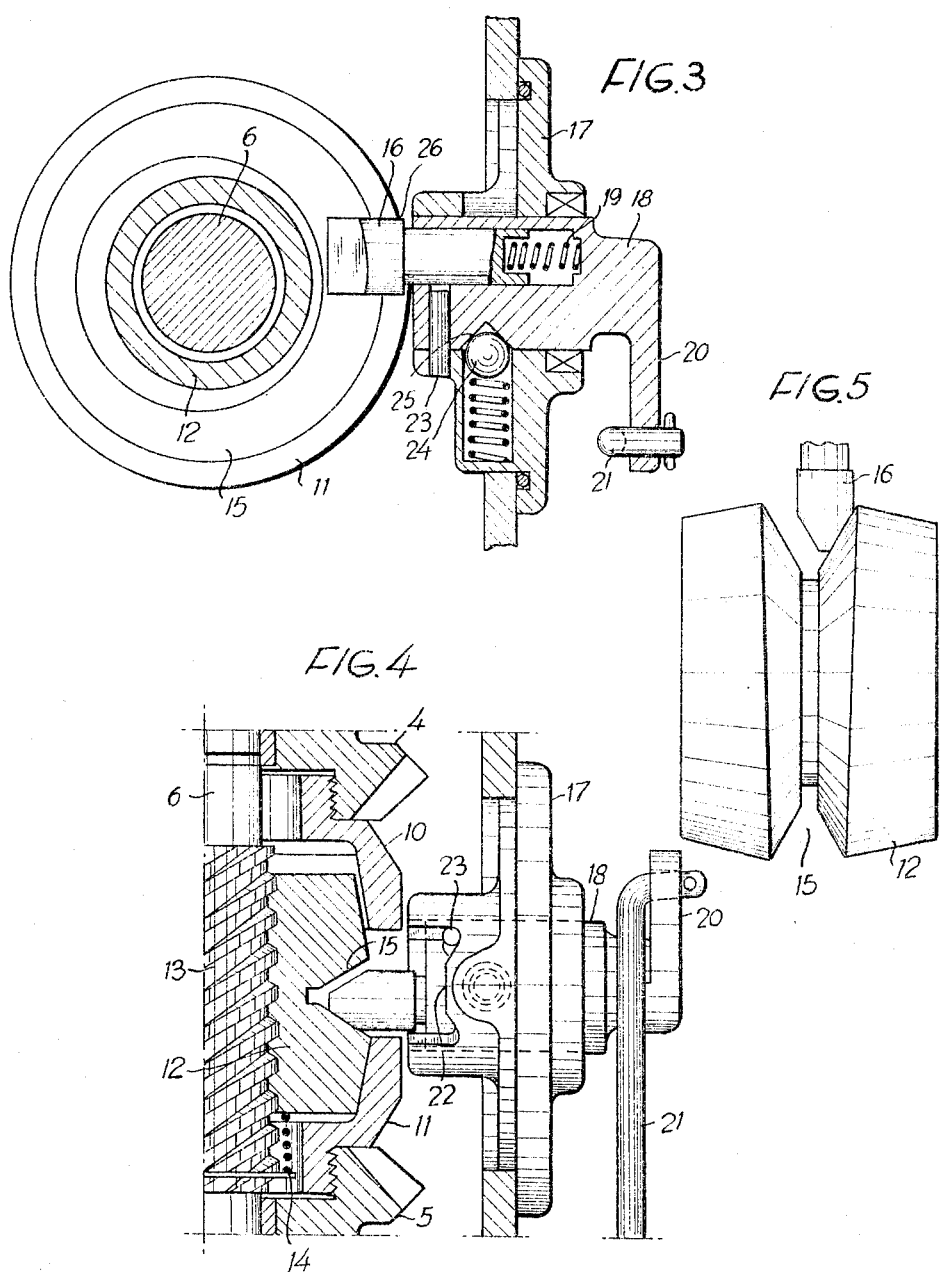

3,269,497
CLUTCH MECHANISM
Karl Abdon Bergstedt, Goteborg, Sweden, assignor to Aktiebolaget Volvo Penta, Goteborg, Sweden, a corporation of Sweden
Filed Oct. 5, 1964, Ser. No. 401,469
Claims priority, application Sweden, Oct. 14, 1963, 11,272/63
11 Claims. (Cl. 192—51)

This invention relates to a clutch mechanism for a gear, such as a reversing gear in a boat, of the type comprising two friction clutches and an intermediate clutch element which is axially movable on a shaft from a neutral position into engagement with one or the other of two clutch members of the two clutches. The clutch element is adapted to impart rotation to the shaft by means of steep pitch screw threads. If the clutch element is moved into engagement with one or the other of the clutch members it is forced against the clutch member by free-wheel action so that all of the torque is transmitted without the need of an external compressive force. However, if the clutch is to be disengaged a certain effort is required which depends on the torque transmitted on that occasion. E.g., in case of motor boat engines the fuel supply is usually reduced before the clutch is disengaged so that the engine is idling during the disengaging operation, but a certain amount of torque always remains to be overcome during this operation. This remaining torque is likely to cause difficulties in the operation, especially because the remote control system is usually of small dimensions.

The object of this invention is to provide a reversing mechanism in which the engine power is used even for disengaging the clutch so that very small operating forces are required. The invention is characterized in that the clutch element has an annular peripheral groove which is so shaped that the sides of the groove during rotation are axially reciprocating, and that a sliding pin extending substantially radially toward the shaft is adapted to engage the annular groove, the arrangement being such that due to cooperation of the sliding pin with one or the other side of the groove the clutch element is forced out of engagement with the respective clutch member.

Figure 1:
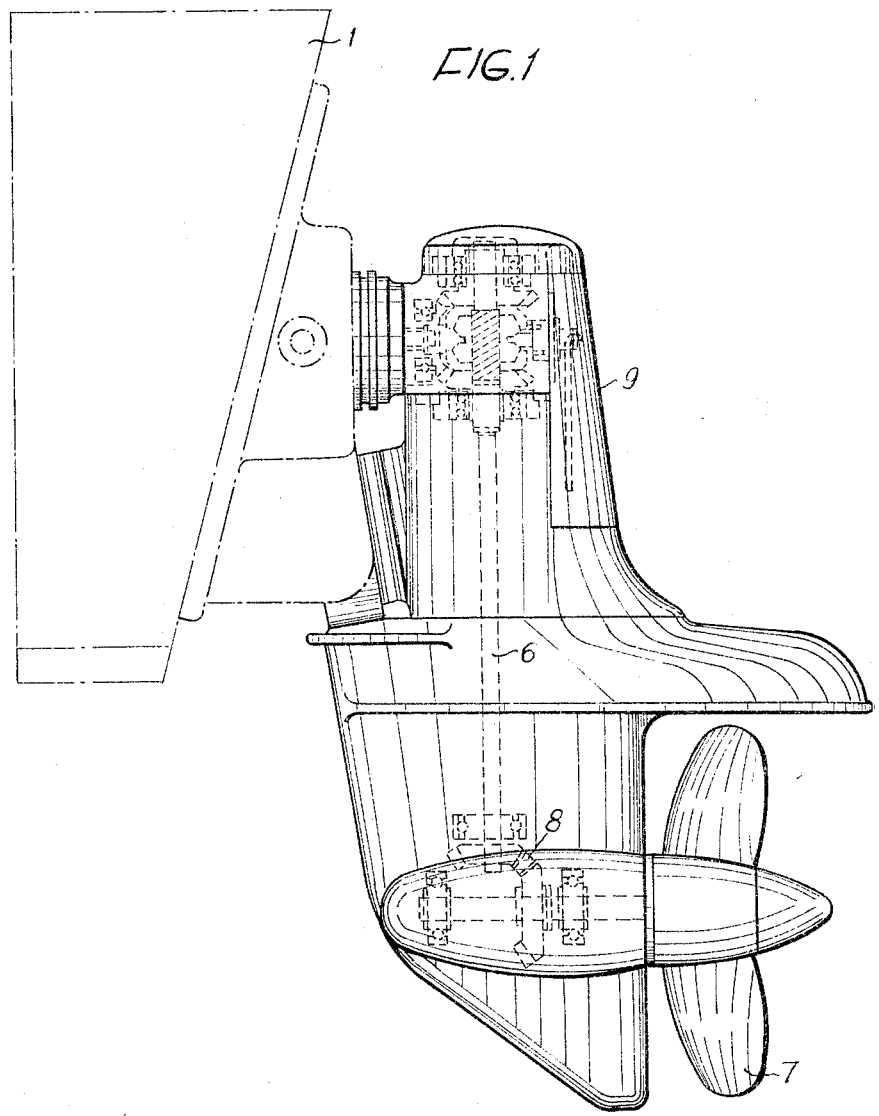
Figure 2:
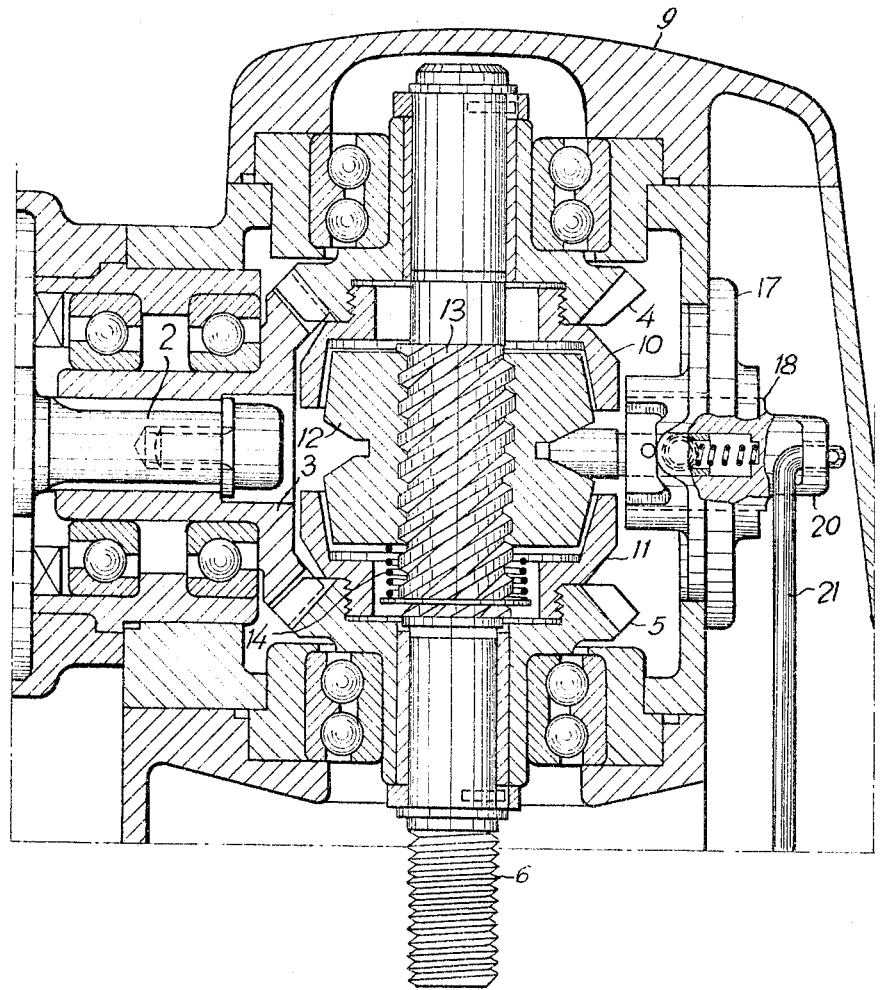

An embodiment of the invention is described more closely with reference to the annexed drawings in which FIG. 1 is an elevation of a propeller housing secured to the stern of a boat and including a reversing mechanism according to the invention, FIG. 2 a longitudinal sectional view of the top portion of the propeller housing and the reversing mechanism with appertaining control members, FIG. 3 a cross-sectional view of the control members, FIG. 4 a longitudinal sectional view taken at right angles to FIG. 3, and FIG. 5 an elevation of a clutch element and a pin for displacing the element.

An input shaft 2 driven by an engine mounted in the stern part of a boat 1 is provided with a bevel pinion 3 which is in constant mesh with two bevel wheels 4 and 5 which are freely rotatable on a shaft 6 adapted to drive a propeller 7 via a bevel gear 8. The gear wheels 4 and 5 are facing each other so that the shaft 6 when connected to one or the other of the gear wheels will be driven in opposite directions. The gear wheels 4 and 5 are axially and radially mounted in the propeller housing 9. Their confronting sides are secured to clutch members 10 and 11, respectively, having conical friction surfaces. A clutch element 12 disposed between the clutch members 10, 11 and having two conical friction surfaces is mounted for turning and axial movement on steep pitch screw threads 13 on the shaft 6. In the normal position of the clutch which in this connection corresponds to the position for forward propulsion of the boat one of the friction surfaces of the element 12 is in engagement with the friction surface of the clutch member 10 under the action of a helical spring 14 or the like.

Reversing and shifting of the clutch to neutral position is effected by means of a mechanical control system which by means of a rod, wire or the like is connected to a remote control in the boat. The clutch element 12 has a central peripheral V-shaped groove 15 the centre of which is eccentric to the axis of the shaft 6. Consequently, during rotation the sides of the groove will axially reciprocate. The groove receives a wedge-shaped sliding pin 16 which is eccentrically mounted for turning and axial movement in a control shaft which also is mounted for turning and axial movement in a sleeve 17. The sliding pin 16 is forced into contact with the sides of the groove 15 by means of a helical spring 19 inserted between the end of the sliding pin 16 and the bottom of the bore in the control shaft 18 which has a radially directed lever 20 which by means of a rod 21 can be turned to different control positions. The sleeve 17 is connected with a cover which closes an opening in the propeller housing 9 opposite the clutch element 12. At the end adjacent the sliding pin the sleeve 17 has an axially directed cam 22 in engagement with a radially directed pin 23 on the control shaft 18. Consequently, when the control shaft is turned it is also moved axially. Detent means in the form of a spring-loaded ball or locking member 24 mounted in the sleeve 17 is provided to retain the control shaft in the different control positions by entering recesses 25 in this shaft. The cam 22 is formed such that the control shaft 18 in the neutral position of the clutch is forced inward toward the clutch element but can move outwards in the two positions of engagement.

The mode of operation of the reversing mechanism is as follows. In operation with the clutch is engaged position for forward or backward propulsion the sliding pin 16 moves inwards and outwards in the V-groove 15 due to the eccentricity of the groove and under the action of the spring 19. If the control shaft 18 is turned toward its central position for clutch disengagement it is forced inwards towards the clutch element 12 by the pin 23 and the cam 22 cooperating therewith. Due to its eccentric mounting in the control shaft 18 the sliding pin 16 is simultaneously turned toward its central position. Since the clutch element still is in engaged position, the sliding pin 16 will be forced outward and ride step by step up on one side of the V-groove 15. However, the axial outward movement of the sliding pin is not great and is limited by a shoulder 26 which comes into contact with the end of the control shaft 18. Since this shaft cannot yield either, the clutch element 12 will be forced out of engagement with the clutch member 10 or 11 and the clutch will be disengaged under the action of the small effort required to turn the control shaft 18.

It will be understood that the invention is not limited to the above described embodiment. E.g., the clutch element may be provided with an eccentric, projecting cam which is straddled by prongs on the pin 16. Further the invention may be applied to all kinds of gears combined with friction clutches, such as conventional so called straight reversing gear in which a bevel gear wheel having a clutch member is mounted on an input shaft whereas the clutch element is mounted for limited turning movement on an output shaft and an intermediate gear wheel is in mesh with the first-named conical gear wheel and with another gear wheel which is freely rotatable on the output shaft and provided with a corresponding clutch member. Upon displacement of the clutch element into engagement with one or the other coupling member the output shaft will be driven forward or backward and in the intermediate position the output shaft is disconnected.

The same mechanism may also be applied to clutches and gears having spur wheels and conical clutches for reducing the required control effort and for permitting remote control by means of a wire or similar control member of small dimensions.

What I claim is:

1. In a clutch mechanism comprising a first clutch member, a cooperative second clutch member, means mounting said first clutch member for rotation about its axis in fixed position longitudinally of said axis, means mounting said second clutch member for rotation about and for sliding longitudinally of said axis in a first direction into engagement with said first clutch member and in an opposite second direction out of engagement therewith, an output shaft, means for rotatably driving one of said clutch members, and means connecting the other of said clutch members for driving said output shaft, means for selectively sliding said second clutch member axially into and out of engagement with said first clutch member, wherein said selectively sliding means comprises peripheral walls on said second clutch member eccentric with said axis, said walls defining an exposed eccentric groove, a sliding pin having a wedge-shaped portion disposed in said groove, one of said walls facing generally in said first direction and the other of said walls facing generally in said second direction, and control means to move said pin selectively in said first and second directions.

2. In the clutch mechanism as defined in claim 1, further comprising yieldable means engaging said sliding pin to urge said sliding pin in a direction inwardly of said groove, said sliding pin reciprocating toward and away from said axis against said yieldable means following the eccentricity of said groove as said second clutch member rotates.

3. In a reversing mechanism comprising a first shaft, a second shaft, a first friction clutch member, a second friction clutch member, drive connection means differentially connecting said clutch members to said first shaft whereby said first clutch member and said second clutch member rotate in opposite directions, a friction surface extending peripherally around each said clutch member, a clutch element having opposed friction surfaces and cooperating with said friction surface of each said clutch member, said clutch element being movable from a neutral position into selectively operable engagement with said friction surface of either of said clutch members, said clutch element having an annular peripheral groove, said groove having an operative bottom portion which reciprocates at generally right angles to the longitudinal axis of said clutch element when said clutch element is rotated, and a sliding pin extending generally perpendicularly toward said longitudinal axis of said clutch element and disposed in said groove, said sliding pin being operable to be brought into contact selectively with one and the other side of said groove so as to force said clutch element selectively into or out of engagement with either of said clutch members.

4. In the reversing mechanism as defined in claim 3, wherein said annular groove is generally V-shaped, the operative bottom portion of said annular groove being eccentric to the longitudinal axis of rotation of said clutch element, said sliding pin having an outer surface with a pair of bevel flanks for engaging the sides of said V-shaped annular groove.

5. A reversing mechanism comprising a first shaft, a second shaft, a first friction clutch member, a second friction clutch member, drive connection means differentially connecting said members to said first shaft whereby said first clutch member and said second clutch member rotate in opposite directions, a friction surface extending peripherally around each said clutch member, a clutch element having opposed friction surfaces to cooperate with said friction surface of each said clutch member and being mounted for limited axial movement from a neutral position into selectively operable engagement with said friction surface of either of said clutch members, said clutch element having an annular peripheral groove, said groove having an operative bottom portion which reciprocates at generally right angles to the longitudinal axis of said clutch element when said element is rotated, a sliding pin extending generally perpendicularly toward the longitudinal axis of said clutch element and disposed in said groove, said sliding pin being operable to be brought into contact selectively with one and the other side of said groove so as to force said clutch element selectively into and out of engagement with either of said clutch members, a control member mounted for turning movement and displaceable radially of said clutch element, said sliding pin being eccentrically mounted to said control member and being movable to and fro in said groove of said clutch element, and resilient means biasing said sliding pin toward said groove, said sliding pin having a shoulder for cooperation with said control member to limit the movement of said sliding pin away from said bottom portion of said groove within said clutch element.

6. A reversing mechanism comprising a housing, a first shaft, a second shaft, a first friction clutch member, a second friction clutch member, drive connection means differentially connecting said clutch members to said first shaft whereby said first clutch member and said second clutch member rotate in opposite directions, a friction surface extending peripherally around each said clutch member, clutch means having opposed friction surfaces to cooperate selectively with said respective friction surface of each said clutch member and being mounted for limited axial movement from a neutral position into selectively operable engagement with said friction surface of either of said clutch members, said clutch means having an annular peripheral groove having an operative bottom portion which reciprocates at generally right angles to the longitudinal axis of said clutch means when said means is rotated, a sliding pin extending generally perpendicularly toward said longitudinal axis of said clutch means and disposed in said groove, said sliding pin being operable to be brought into contact selectively with one and the other side of said groove so as to force said clutch means selectively into and out of engagement with either of said clutch members, a control member mounted for turning movement and displaceable radially of said clutch means, said sliding pin being eccentrically mounted to said control member and being movable to and fro in said groove of said clutch means, and resilient means biasing said sliding pin inwardly of said groove.

7. The reversing mechanism as defined in claim 6, further comprising cooperative camming means between said control member and said housing operative in response to rotation of said control member to move said member toward and away from said groove whereby the biasing force of said resilient means is dependent upon the rotative position of said control member.

8. The reversing mechanism as defined in claim 7, wherein said camming means comprises a cam surface portion on said housing and a cam follower portion on said control member, and wherein said resilient means maintains said cam follower portion in engagement with said cam surface portion.

9. In the reversing mechanism as defined in claim 8, further comprising detent means between said housing and said control member for releasably locking said control member in one of its selected positions.

10. In the reversing mechanism as defined in claim 9, wherein said one of its selected positions is the neutral position of said control member.

11. In the reversing mechanism as defined in claim 10, wherein said detent means includes a locking member and a spring, an indexing recess in said control member for receiving thereinto said locking member when said control member is in its neutral position, said spring biasing said locking member toward said control member whereby said locking member engages within said recess when said recess and locking member are aligned, said locking member being adapted to be retracted against the spring bias upon forcibly moving said control member to misalign said recess and locking member.

References Cited by the Examiner

UNITED STATES PATENTS

| 1,581,678 | 4/1926 | Chesley. |
| 2,086,496 | 7/1937 | Geldhof. |
| 3,212,349 | 10/1965 | Bergstedt _____ 74—378 |

FRANK SUSKO, *Primary Examiner.*

BENJAMIN W. WYCHE III, *Examiner.*